US012620317B1

(12) United States Patent
Moncrief Brown et al.

(10) Patent No.: US 12,620,317 B1
(45) Date of Patent: May 5, 2026

(54) FLIGHT PATH OPTIMIZATION FOR AERIAL-BASED DAMAGE ASSESSMENT

(71) Applicant: UIPCO, LLC, San Antonio, TX (US)

(72) Inventors: Donnette L. Moncrief Brown, San Antonio, TX (US); Robert Wiseman Simpson, Fair Oaks Ranch, TX (US); Manfred Amann, San Antonio, TX (US); Timothy Frank Davison, San Antonio, TX (US); Snehal Desai, Richardson, TX (US); Michael J. Maciolek, Kerrville, TX (US); Kelsey Anne O'Brien, Austin, TX (US); Eric David Schroeder, San Antonio, TX (US); Emily Margaret Gray, San Antonio, TX (US); Justin Dax Haslam, San Antonio, TX (US); Matthew Ryan Santacroce, Rio Rancho, NM (US)

(73) Assignee: United Services Automobile Association (USAA), San Antonio, TX (US)

( * ) Notice: Subject to any disclaimer, the term of this patent is extended or adjusted under 35 U.S.C. 154(b) by 235 days.

(21) Appl. No.: 17/504,950

(22) Filed: Oct. 19, 2021

Related U.S. Application Data

(60) Provisional application No. 63/094,502, filed on Oct. 21, 2020.

(51) Int. Cl.
| | |
|---|---|
| *G08G 5/32* | (2025.01) |
| *G01C 21/20* | (2006.01) |
| *B64U 10/13* | (2023.01) |
| *B64U 101/30* | (2023.01) |

(52) U.S. Cl.
CPC .............. *G08G 5/32* (2025.01); *G01C 21/20* (2013.01); *B64U 10/13* (2023.01); *B64U 2101/30* (2023.01); *B64U 2201/10* (2023.01)

(58) Field of Classification Search
CPC ...... B64C 39/024; B64U 10/00; B64U 10/13; B64U 2101/30; B64U 2101/31;
(Continued)

(56) References Cited

U.S. PATENT DOCUMENTS

| | | | | |
|---|---|---|---|---|
| 10,466,696 | B2 * | 11/2019 | Hardee | ................. B64U 10/14 |
| 2017/0192418 | A1 * | 7/2017 | Bethke | .................. B64U 10/13 |

(Continued)

OTHER PUBLICATIONS

Tauã M. Cabreira, Lisane B. Brisolara, Paulo R. Ferreira Jr . . . Survey on Coverage Path Planning with Unmanned Aerial Vehicles. Drones. 2019; 3(1):4. https://doi.org/10.3390/drones3010004. 38 pages.

(Continued)

*Primary Examiner* — Angela Y Ortiz
*Assistant Examiner* — Aaron K McCullers
(74) *Attorney, Agent, or Firm* — Plumsea Law Group, LLC

(57) ABSTRACT

A system and method for automatically pre-generating a flight path for an unmanned aerial vehicle (UAV) to survey a target location is disclosed. The system comprises a computing system that considers environmental conditions such as external and structural factors about the target location to determine an optimal time and route that should be employed in order to best obtain the desired images of selected structures. The factors can include data about the weather, lighting, and atmospheric conditions in the target region, as well as specific physical characteristics for the structures and surrounding land, and features that have been designated as being of higher importance. By customizing the flight path to reflect the target location's particular environmental and structural conditions, the UAV can obtain images of greater quality and relevance.

9 Claims, 10 Drawing Sheets

(58) Field of Classification Search
CPC ............ B64U 2101/32; B64U 2101/55; B64U
2101/56; B64U 2101/57; B64U 2101/58;
B64U 2201/10; G01C 21/20; G01C
21/34; G05D 1/106; G05D 1/1062; G08G
5/003; G08G 5/0034; G08G 5/0039;
G08G 5/0047; G08G 5/0073; G08G
5/0086
USPC ....... 701/400, 408, 409, 410, 411, 415, 420,
701/438, 448, 451, 467, 484, 485, 528,
701/532, 533
See application file for complete search history.

(56) References Cited

U.S. PATENT DOCUMENTS

2017/0206648 A1* 7/2017 Marra .................. G05D 1/0094

| | | | | |
|---|---|---|---|---|
| 2017/0259912 | A1* | 9/2017 | Michini | .............. G05D 1/0011 |
| 2017/0358225 | A1* | 12/2017 | Priest | ...................... G06F 16/29 |
| 2018/0003656 | A1* | 1/2018 | Michini | ................. H02S 50/10 |
| 2018/0074488 | A1* | 3/2018 | Cantrell | .............. G05D 1/0246 |
| 2018/0286255 | A1* | 10/2018 | Beth | ...................... B64D 43/02 |
| 2019/0051191 | A1* | 2/2019 | Mosher | ................. G06V 20/17 |
| 2019/0094861 | A1* | 3/2019 | Menzel | ................. G05D 1/106 |
| 2020/0217830 | A1* | 7/2020 | Shore | ................. A01M 7/0089 |

OTHER PUBLICATIONS

Florence Ho, Ana Salta, Ruben Geraldes, Artur Goncalves, Marc Cavazza, and Helmut Predinger. 2019. Multi-Agent Path Finding for UAV Traffic Management. In Proc. of the 18th International Conference on Autonomous Agents and Multiagent Systems (AAMAS 2019), Montreal, Canada, May 13-17, 2019, IFAAMAS, 9 pages.

* cited by examiner

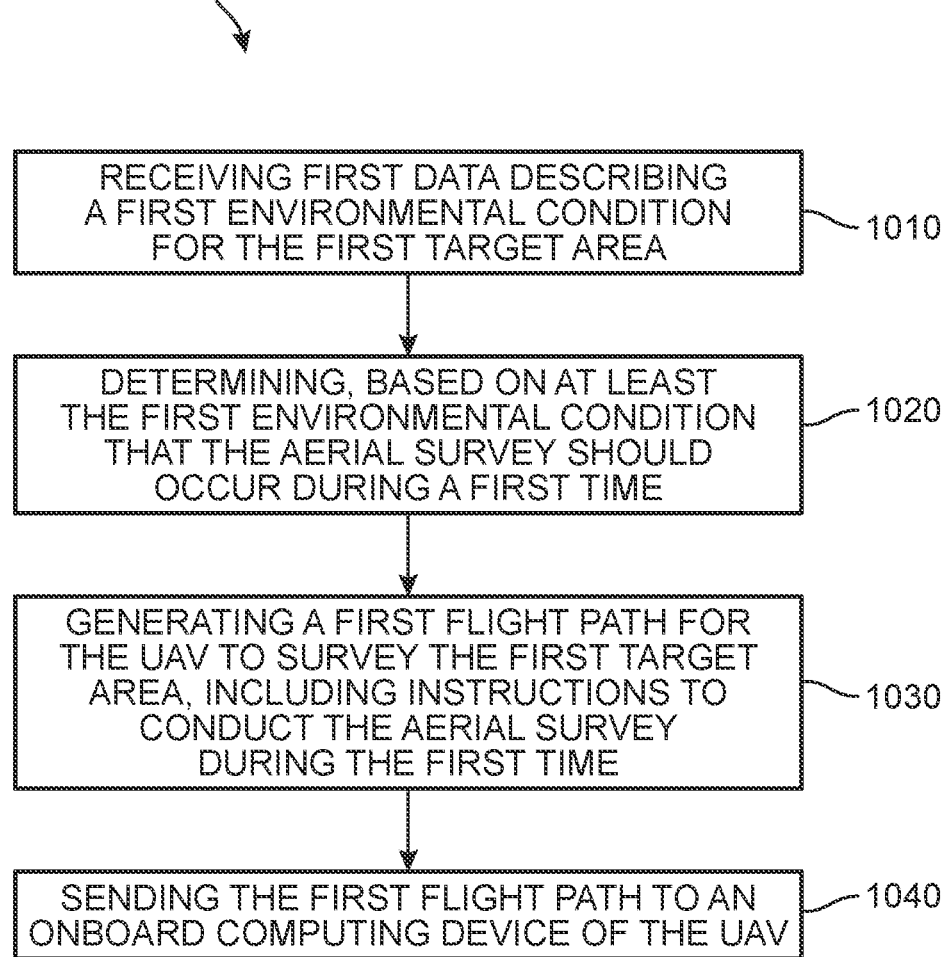

1000

RECEIVING FIRST DATA DESCRIBING A FIRST ENVIRONMENTAL CONDITION FOR THE FIRST TARGET AREA ~1010

DETERMINING, BASED ON AT LEAST THE FIRST ENVIRONMENTAL CONDITION THAT THE AERIAL SURVEY SHOULD OCCUR DURING A FIRST TIME ~1020

GENERATING A FIRST FLIGHT PATH FOR THE UAV TO SURVEY THE FIRST TARGET AREA, INCLUDING INSTRUCTIONS TO CONDUCT THE AERIAL SURVEY DURING THE FIRST TIME ~1030

SENDING THE FIRST FLIGHT PATH TO AN ONBOARD COMPUTING DEVICE OF THE UAV ~1040

FIG. 10

FLIGHT PATH OPTIMIZATION FOR AERIAL-BASED DAMAGE ASSESSMENT

CROSS-REFERENCE TO RELATED APPLICATION

This application claims the benefit of U.S. Provisional Patent Application Ser. No. 63/094,502 filed on Oct. 21, 2020 and titled "Flight Path Optimization For Aerial-Based Damage Assessment", the disclosure of which is incorporated by reference in its entirety.

TECHNICAL FIELD

The present disclosure generally relates to flight path optimization techniques, and in particular to a system and method for more efficiently assessing damage done to structures using aerial imagery by customizing and generating flight path for unmanned aerial vehicles (UAVs) that is better positioned to capture images of a target structure and/or accommodate current environmental conditions of a particular target location.

BACKGROUND

Following disasters such as floods, hurricanes, fires, and tornadoes, entities that insure properties in the disaster area may need to survey the area in order to assess any damage that has impacted one or more insured properties. For large scale disaster areas, aerial imagery may be used to assess damage. Specifically, an aerial vehicle may fly over the disaster area collecting continuous images that may later be combined into a single ortho-mosaic image. These images can be used to identify generally whether a structure has been damaged. However, obtaining further information regarding the extent of such damage has remained a time-consuming and resource intensive task, typically requiring a human agent to visit the structure in person to more closely examine the effects of the disaster. Even when such examinations are necessary, local environmental conditions following a disaster can prevent access to the structure for several days or weeks. This process can lead to delays for homeowners and other insured entities in receiving much needed relief or support. The ability to quickly and accurately detect what portions of a structure have been damaged and correctly determining the degree of such damage, without the need for on-site manual inspections or other time-intensive tasks, is highly desirable. In order to ensure the most effective image capture by a UAV of a structure, a flight path should take into account the particular conditions associated with that location.

There is a need in the art for a system and method that addresses the shortcomings discussed above.

SUMMARY

In one aspect, a method of improving the efficiency of an aerial survey performed by an unmanned aerial vehicle (UAV) for one or more structures at a first target area is disclosed. The method includes a first step of receiving first data describing a first environmental condition for the first target area, and a second step of automatically determining, based on at least the first environmental condition, that the aerial survey should occur during a first time. In addition, the method includes a third step of automatically generating a first flight path for the UAV to survey the first target area, the first flight path including instructions to conduct the aerial survey during the first time, and a fourth step of sending the first flight path to an onboard computing device of the UAV.

In another aspect, an alternate method of improving the efficiency of an aerial survey performed by an unmanned aerial vehicle (UAV) for one or more structures at a first target area is disclosed. The method includes a first step of receiving first data describing a first structural characteristic for a first structure in the first target area. In addition, the method includes a second step of automatically determining that the aerial survey should include a first set of waypoints to accommodate the first structural characteristic. The method further includes a third step of automatically generating a first flight path for the UAV to survey the first target area, the first flight path including the first set of waypoints, and a fourth step of sending the first flight path to an onboard computing device of the UAV.

In another aspect, a system for improving the efficiency of an aerial survey performed by an unmanned aerial vehicle (UAV) for one or more structures at a first target area includes a processor and machine-readable media including instructions which, when executed by the processor, cause the processor to receive first data describing a first structural characteristic for a first structure in the first target area. The instructions further cause the processor to automatically determine that the aerial survey should include a first set of waypoints to accommodate the first structural characteristic. In addition, the instructions cause the processor to automatically generate a first flight path for the UAV to survey the first target area, the first flight path including the first set of waypoints, as well as to send the first flight path to an onboard computing device of the UAV.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 a flow chart depicting a process of improving the efficiency of an aerial survey performed by an unmanned aerial vehicle (UAV) for one or more structures at a first target area, according to an embodiment.

DESCRIPTION OF THE EMBODIMENTS

The embodiments provide a system and method for improving the process of image collection of buildings or other structures during aerial surveys. Aerial images are typically collected by UAVs. These images are then be analyzed to find buildings that may be damaged either immediately following an acute event such as a natural disaster or more gradually over time. In many cases, once the images have been captured, ground systems perform image processing on the captured images to locate, isolate, and process images of individual homes and buildings, and identify points of damage. While providing valuable insight for damage assessments, this process has remained highly time-intensive.

The proposed systems and methods are directed to an intelligent identification of a flight path for a UAV in advance of an image collection flight session (also referred to as an aerial survey). The flight path will be customized to accommodate the specific geographical and structural characteristics of the targeted region, thereby increasing the likelihood of capturing all pertinent information and accurately determining the type and extent of damage to buildings in the region. In some embodiments, the systems can also take into account a wide range of factors including but not limited to environmental information for the target location, such as thermals, lighting conditions, and seasonality when generating the route, thereby increasing the likelihood of capturing high-quality, clear, and detailed imagery.

The disclosed embodiments describe techniques that can be implemented to offer enhanced insights of critical data points for use by insurance companies and other parties. Such insights can represent information about specific portions of the buildings that have been damaged as well as the extent of damage at each portion, allowing for a more accurate estimate of rebuilding costs to be produced. Based on the received information about conditions associated with the target location, the system generates and plots a route that is customized for surveying the structures at that location. This pre-programmed route is communicated to the onboard computing system of a UAV. The route will direct the UAV along a specific track that has been determined to represent the optimal approach for obtaining aerial imagery of the target location(s) for the intended purpose of assessing damage at those locations. In some embodiments, additional instructions are conveyed to the onboard computing system for controlling the orientation of one or more cameras on the aerial vehicle. The cameras can then capture views of one or more houses from a series of different angles as the aerial vehicle passes over, or nearby, those houses. Such high-resolution aerial imagery provides insurers with vital information to better serve policyholders, speed up the claims resolution process, and aid in improved fraud detection.

Figure 1:
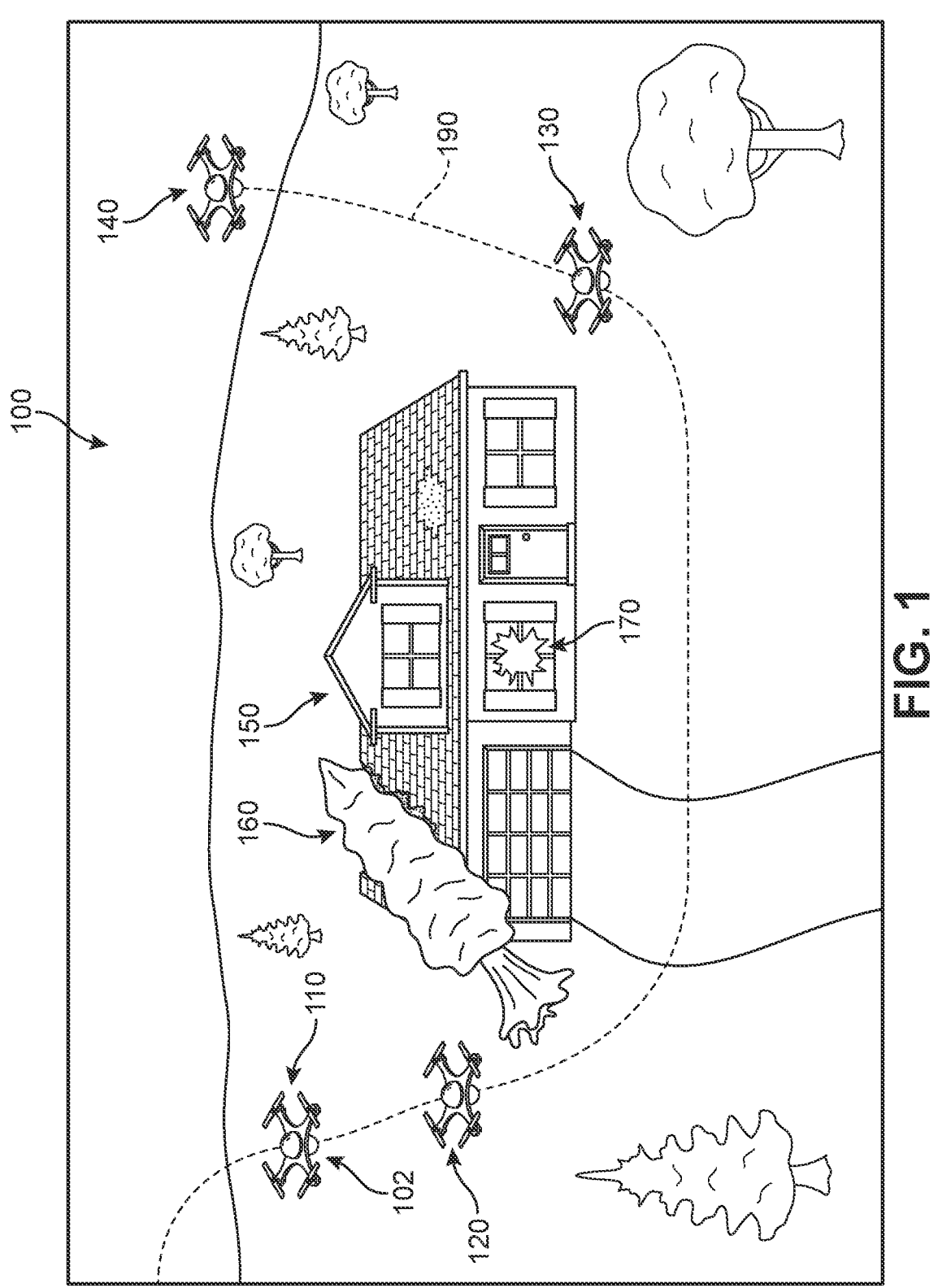
FIG. 1 is a depiction of an example of an implementation of the pre-generated flight path being employed by an unmanned aerial vehicle (UAV) during an aerial survey, according to an embodiment.

For purposes of clarity, an overview of one embodiment of the proposed systems and methods is illustrated with reference to FIG. 1. In FIG. 1, an example of an implementation of the proposed system is shown as executed via the onboard computing device of a UAV 102. In different embodiments, the UAV 102 is configured to capture aerial-based image data of one or more structures or other points of interest located at a target site 100. The target site 100 may include various structures, such as a residence 150. As used herein, the term "building" or "structure" can refer to any kind of building, such as a home, or other residential building, a shed, barn, a commercial building or any other related structures. A building typically can include a roof, room, walls, support structures, windows, or other features. In some cases, the primary structure can be associated with additional secondary structures, features, or property that may be disposed adjacent to or otherwise near the primary structure. In some embodiments, the captured image data can then be used to generate different models over time, allowing for a comparison of the structure between a first point in time (e.g., pre-disaster) and a second point in time (e.g., post-disaster). In other words, this imaging data may be used to detect damage in real-time and/or deviations in the structure over time.

In FIG. 1, the residence 150 has been exposed to a natural disaster, and as a result was heavily damaged. In this case, the residence 150 can be seen to have suffered structural damage 170 as well as exposure to nearby fallen debris 160. The damage assessment initiated by an insurer may encompass the entirety of the structure of residence 150 and can therefore depend heavily on image data being captured over multiple different angles and spatial views that provide the most salient and clear information about the condition of the structure. As shown in FIG. 1, the onboard computing system for UAV 102 has received and is executing a pre-programmed first flight path 190 that directs the UAV 102 to particular spatial locations (e.g., geospatial coordinates) around the residence 150. In this case, the first flight path 190 includes a first position 110, a second position 120, a third position 130, and a fourth position 140. Prior to the arrival of the UAV at the target site 100, the first flight path 190 was determined to represent the most efficient path through each of these positions. The UAV 102 executes the generated route to optimize image collection of the designated structure and any other targeted features in the target site 100.

Figure 2:
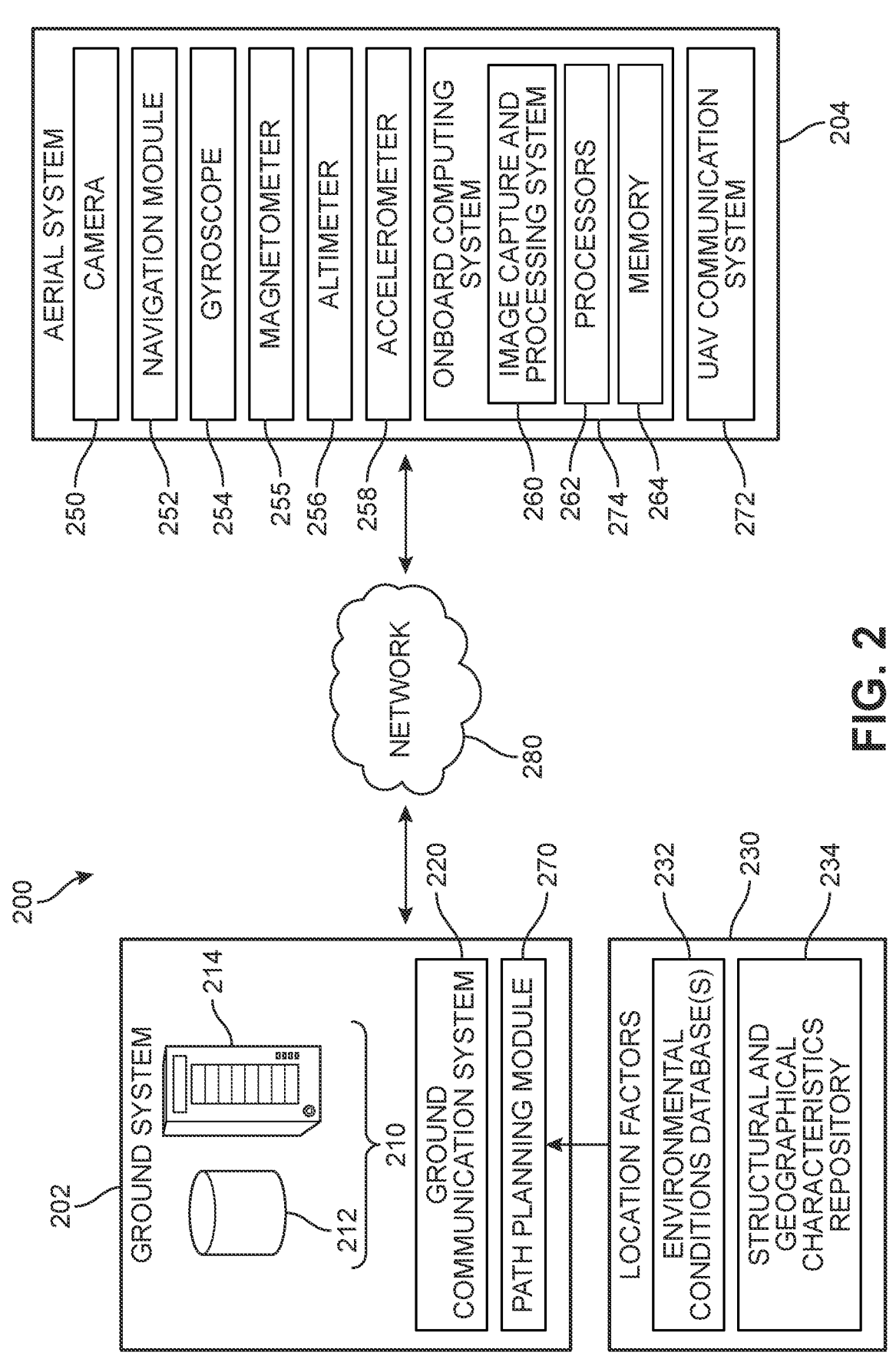
FIG. 2 is a schematic view of a system for determining an optimal coverage path for a UAV mission, according to an embodiment.

Referring now to FIG. 2, a schematic diagram of an embodiment of a system for determining an optimal coverage path for UAV missions is depicted. In different embodiments, some of the steps may be performed by ground-based computing system(s) and some of the steps may be performed by aerial system(s). FIG. 2 depicts system 200 that is further comprised of a ground system 202 and an aerial system 204. The ground system 202 includes provisions for gathering information about potentially damaged structures following a disaster that can be used to facilitate an image survey of the disaster area. The ground system 202 may also include provisions for communicating with various other systems as well as for processing image data received from UAVs. The aerial system 204 includes provisions for navigating and capturing aerial images of one or more areas. Aerial system 204 may also include provisions to determine precise locations for captured images, as well as for performing image processing.

As seen in FIG. 2, ground system 202 comprises a computing system 210. Computing system 210 can include, for example, a computer 212 and a database 214. Computer

212 may further include one or more processors and memory. Computer 212 could be any kind of computer such as a desktop computer, a laptop computer, a server, or any other kind of computer with sufficient computing resources for performing tasks such as image classification.

Ground system 202 may also include a path planning module 270. Path planning module 270 may include any program or algorithm that is used to determine a route to one or more specified target locations that takes into account one or more location-specific factors ("location factors") 230 associated with the target location (see FIGS. 3A and 3B), such as but not limited to data provided by an environmental conditions databases 232 and/or a structural and geographical characteristics repository ("structural repository") 234. In some embodiments, path planning module 270 includes one or more machine learning models. In one embodiment, path planning module 270 could include a convolutional neural network. In other embodiments, path planning module 270 could comprise any other algorithm (or set of algorithms) from the field for machine learning and/or machine vision.

In different embodiments, the algorithms can be implemented as software running on a processor, DSP processor, special purpose ASIC and/or FGPA's. The algorithms can also be a mixture of custom developed algorithms and libraries. The algorithms can further be arranged in any logical sequence, with potential changes in the sequence of processing or parameters governing the processing determined by image type, path requirements, computational requirements, or outputs from other algorithms.

As a general matter, the path planning module 270 is configured, given an area of interest ("target location" or "target environment"), to plan and generate a path which covers the salient features of the target environment considering the mission objectives, image capture restrictions and/or environmental conditions associated with the target location, the UAV's motion restrictions and sensor's characteristics, as well as obstacles that may be present on the way to, during, and after the image collection session. In an aerial context, the obstacles can represent no-flight zones (NFZ) that the UAV. The target environment is usually split into non-intersecting regions called cells using a decomposition technique. The size and resolution of the cells may change according to the type of decomposition and a specific strategy should be applied in order to guarantee the complete coverage. These cells typically are proportional to the camera's range (aerial coverage), representing only one point in the projected path. In aerial coverage, the UAVs fly at a certain altitude from the ground carrying a camera as a sensor to perform the task. In this case, the size of the cells is proportional to the footprint of the camera in the UAV, and the grid resolution is obtained through the image requirements, such as resolution and overlapping rates, and the image sensor characteristics. The UAV coverage path is composed of a set of waypoints, where each waypoint represents a navigation command to the vehicle, such as take-off, change of speed or move to a specific location, and contains information about the latitude, longitude and altitude. In one embodiment, the flight paths are typically followed by implementing guidance systems such as discrete sets of waypoints that are usually generated on a remote ground station and then wirelessly relayed to the UAV's autopilot. For purposes of this application, a waypoint is a specified geographical location used to define an area navigation route or the flight path of a UAV employing area navigation.

These waypoints have all the necessary localization information to guide the vehicle and the cells are proportional to the footprint of the camera. More specifically, a waypoint at a minimum refers to data that includes a set of coordinates that identify a specific point in physical space. A ground system equipped with waypoint technology typically utilizes Global Positioning System (GPS) and Global Navigation Satellite System (GLONASS) to create waypoints. As long as the UAV is able to connect with at least four GPS or GLONASS, precise three-dimensional positioning (longitude, latitude, altitude) can be determined. Thus, waypoints can be used to describe the flight path. In some embodiments, a waypoint may further include instructions for the flight path between two sets of coordinates and the maneuvers that should be performed by the UAV between each set of coordinates. Furthermore, the position of the waypoint also determines the arrival time accuracy.

In different embodiments, the path planning module 270 implements one or more path coverage algorithms that generate coverage paths according to the application requirements. For instance, a main goal of a damage assessment mission may be to create an ortho-mosaic composed by a set of overlapping aerial photographs for the target location. In this case, an application requirement is to guarantee the necessary quantity of frontal and side superposition in the pictures. Another necessary requirement for this type of application is the resolution, which can be calculated as ground sampling distance (GSD), referring to the length on the ground corresponding to the side of one pixel in the image, or the distance between pixel centers measured on the ground. The lower the flight altitude of the UAV, the smaller the GSD and the better the image quality. Thus, the optimal path may indicate an altitude range at which the UAV should be during each image collection event. Furthermore, the number of turning maneuvers can affect the time and the energy spent by the UAV, so in some cases, the minimization of the number of UAV maneuvers can be a consideration to prolong the mission time.

In some embodiments, the path planning module 270 reviews knowledge or information) about the target environment and can virtually re-construct a full map in order to determine which path represents the most effective and efficient execution of the mission according to the pre-defined performance metrics and objectives. In one embodiment, the path generated can thus be represented as a map containing Points Of Interests (POIs). The POIs can be selected or otherwise identified by the end-user, or can be automatically defined based on data received about the target location. The path planning module 270 determines the most efficient path connecting the POIs based on multiple location-specific factors while avoiding obstacles that guarantees complete coverage of the area and offers the highest visibility of the POIs. For example, the algorithm can compute the travelling cost to explore the neighborhood and then determine the sequence of points that should be visited in order to minimize the total distance while adjusting the path to accommodate the environmental and structural considerations for the location. After visiting the POIs a single time, the vehicle typically returns to the initial position. In one example, the overall shortest path can be computed using a Genetic Algorithm (GA).

Aerial system 204 may comprise various systems and components that are disposed within an aerial vehicle (such as aerial vehicle 100). Aerial system 204 may include a camera 250 for capturing images. Camera 250 may comprise any kind of camera, including any kind of digital camera. Aerial system 204 can also include a navigation module 252 that can further include a GPS receiver for receiving GPS information that can be used to determine a GPS location for the aerial vehicle. In addition, the navigation module 252 can receive path instructions from ground system 202 and process and execute the instructions to direct the UAV along the pre-designated path.

Aerial system 204 may also include sensors for measuring orientation, altitude, and/or acceleration. For example, aerial system 204 can include a gyroscope 254, an altimeter 256, and an accelerometer 258. In some embodiments, aerial system 204 can include an altitude and heading reference system (AHRS). Using these devices, the orientation, heading, and height of the aerial vehicle (and of camera 250) can be determined. This information, when used with a GPS location for the aerial vehicle, can be used to infer the location of one or more points in an image taken from the aerial vehicle as described in further detail below.

Aerial system 204 can also include an onboard computing system 274 that can work in conjunction with the other components of aerial system 204. It should be understood that while the path planning module 270 is presented as part of the ground system 202, it can alternatively be incorporated directly in the onboard computing system 274 of aerial system 204. Furthermore, in some embodiments, the path planning module 270 can reside in both the ground system 202 and the onboard computing system 274. The two modules may be configured to communicate with one another and share information to allow for the adjustment of the flight path in real-time (e.g., during the flight mission).

In one example, the onboard computing system 274 further includes an image capture and processing system 260, also referred to simply as processing system 260. Processing system 260 may be used to store, process, and transmit image information. Additionally, in some cases, processing system 260 can receive GPS or other coordinate information about one or more target locations. To facilitate these tasks, image capture and processing system 260 may include one or more processors 262 as well as memory 264. Memory 264 can store instructions for programs that facilitate storing, processing, and transmitting image information.

Both ground system 202 and aerial system 204 can include communication systems. For example, ground system 202 can include a ground communication system 220 and aerial system 204 can include a UAV communication system 272. These communication systems enable information to be transmitted between ground system 202 and aerial system 204 via a network 280. Thus, the type of communication components used in each communication system can be selected according to the type of network used. In some cases, a cellular network could be used so that each communication system includes a cellular radio or other component that enables cellular communication. Using a cellular network may enable information to be exchanged while aerial system 204 is in the air where Wi-Fi or other networks might be unavailable. In other cases, network 280 could comprise any kind of local area network and/or wide area network. In some cases, network 280 may be a Wi-Fi network. Alternatively, ground system 202 and aerial system 204 could be connected by wires, for example, when aerial system 204 is on the ground and near ground system 202.

In different embodiments, one or more components of aerial system 204 could be disposed within a single computing device. Examples of computing devices that could be used include, but are not limited to: laptop computers, tablet computers, smartphones or other computing devices.

Figure 3A:
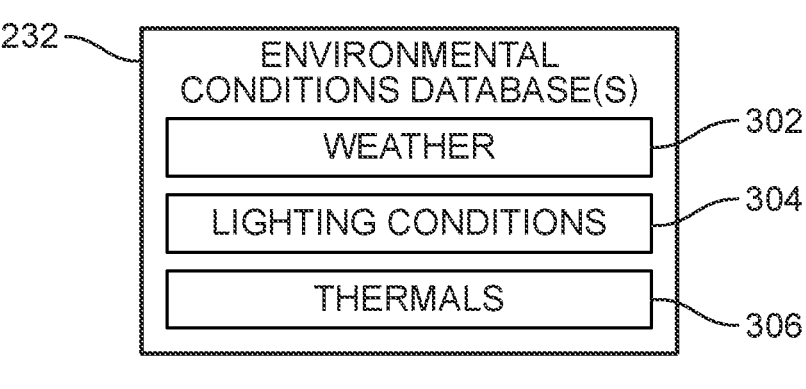
FIGS. 3A and 3B are schematic views of two sets of location factors that may be used by the path planning module of FIG. 2, according to an embodiment.
Figure 3B:
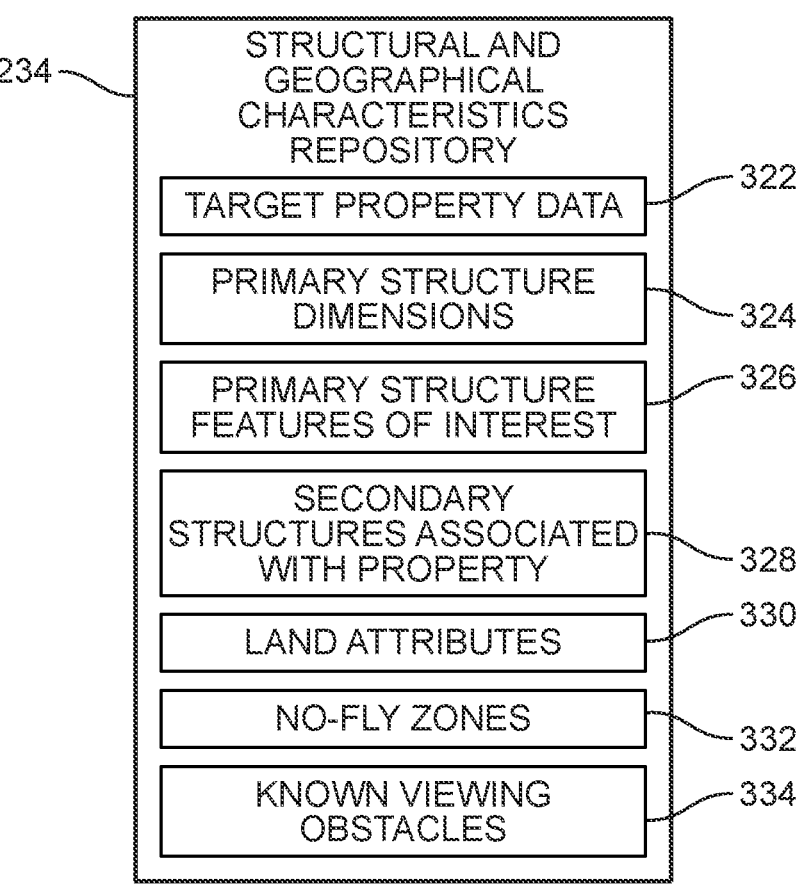

With reference now to FIGS. 3A and 3B, some examples of location factors 230 (see FIG. 2) are provided. In different embodiments, the path planning module can be in communication with external or internal knowledge repositories about a wide range of external environmental conditions, such as environmental conditions database 232. The environmental conditions database 232 can provide data regarding real-time or forecasted conditions that may affect high-resolution image capture and flight performance at the target location. Each of the data points described with reference to FIGS. 3A and 3B can be considered by the path planning algorithm to help determine the optimal path for the UAV to travel that takes into account the unique or specific characteristics of the target location.

While in some embodiments the information obtained by the path planning module is based on access to databases describing historical patterns of environmental conditions for a particular target location and/or predicted environmental conditions for the target location, in other embodiments, the information can be supplemented by sources that offer real-time data for the target location. For example, in some embodiments, data can be collected during manned or other unmanned aviation fly-bys over the target location to build a better localized and instantaneous report of near-current flight conditions rather than only on what is forecast. This can include raw weather data collected by some type of sensor suite including surface and airborne observations, radar, lightning, satellite imagery, and profilers.

In some cases, real-time weather information can be obtained via Flight Information Services (FIS), which is a mechanism for disseminating meteorological (MET) and aeronautical information (AI) to displays in the cockpit in order to enhance pilot situational awareness, provide decision support tools, and improve safety. FIS augments traditional pilot voice communication with Flight Service Stations (FSSs), ATC facilities, or Airline Operations Control Centers (AOCCs). FIS can provide textual and graphical information that can be used by the module to fine-tune the recommended flight path closer to the expected time of departure. Specifically, an FAA-sponsored system referred to as FIS-B may be accessed to receive and display a suite of broadcast weather and aeronautical information products. In other cases, non-FAA FIS Systems can be used to obtain FIS data over both the aeronautical spectrum and on other frequencies using a variety of data link protocols.

In some other examples, reported weather conditions applicable to travel over the target location can be obtained from one or more available sources, such as but not limited to METARs/SPECIs, PIREPs, RAREPs. In one embodiment, the system can monitor the ADS-B flight tracks (position, heading, speed, altitude) for planes flying over or near the target location and/or over a portion of the route to be taken based on the generated flight path to determine the environmental conditions. Such data sources offer real-time, highly accurate information about environmental conditions in the target location. One or more of these and other data sources can provide information that can cause the path planning module to make localized changes in the flight path based on selected parameters. The data can be collected immediately before (up to two or three hours) the selected flight path ("mission") is sent to the UAV, as well as in real-time while the UAV is on its mission, in order to continually optimize the remainder of the mission for best photogrammetry. Thus, the path planning module can continue to modify or adjust the flight path not only prior to the mission, but during the flight itself.

As shown in FIG. 3A, some of these conditions may include weather 302, lighting conditions 304, and/or thermals 306. Each of these aspects can affect the performance of the UAV and detract from the success of its mission. In a first example, weather 304 can strongly impact lighting and flying conditions. Data for real-time or predicted weather conditions can be obtained by the path planning module and decisions regarding the path generated as well as the time at which the flight should occur can be based at least in part on such data. Weather conditions can encompass a variety of different factors. As a general matter, image noise decreases with decreasing temperatures. Noise is a random variation of image density, and the camera(s) will have a built-in image noise reduction system. The presence of noise gives an image an uneven grainy look, occluding details in the image. In cold weather, there is less noise as well as less water vapor, resulting in less haze.

Generally, extremely hot and cold temperatures represent adverse conditions for flying a drone. Both can cause adverse reactions for different constituents of your UAV. As a result, reduced flight performance and/or more rapid drain of the UAV battery may occur. In environments that are too hot, the motors will be made to work harder. In too cold environments, the efficiency of a battery decreases, in some cases to the point that the UAV battery drops below the critical voltage. Thus, in some embodiments, in response to receiving data describing extremes of temperature in the target location for the selected time and/or day, the path planning algorithm can be configured to plan shorter flights, or recommend an alternative time. Furthermore, temperature can affect visibility; for example, cold air may be preferable as it often prevents the build-up of haze.

Similarly, it is typically unadvisable for UAVs to fly when it is raining or snowing. The path planning algorithm may incorporate data regarding expected precipitation intensity and precipitation probability. Precipitation probability refers to probability of precipitation at the given time and location by considering whether the target area generally receives measurable precipitation and the confidence that precipitation will happen in any place in the forecasted area. In addition, overcast days can cause the lighting in the target area to take on a blue tinge. Cameras with an auto white balance feature can be fooled by this and overcompensate. The proposed path can include instructions for the camera to disable the white balance feature if such conditions are forecast. Similarly, the brightness of snow can affect exposure and color meters for the camera, leading to images that are underexposed, and white colors to appear gray or blue. Again, the path planning algorithm can include instructions in such cases to adjust the exposure meter and/or color meter of the camera.

As another non-limiting example, the quantity of water vapor which is present in the air can affect the flight performance of the UAV. If the humidity is very close to 1%, the UAV will become damp or wet. Monitoring of this weather metric may be useful if the operator recognizes that the UAV will be flying on multiple occasions in damp, humid conditions, which will eventually cause damage to the onboard equipment. In addition, UAVs typically do not handle moisture caused by fog very well and can obstruct views of the target structures. Thus, if fog is forecast for the target location, the system may recommend delaying the flight until the fog has passed.

In a second example, lighting 304 can strongly impact visibility, clarity, and resolution of the captured images. Data for real-time or predicted lighting conditions can be obtained by the path planning module and decisions regarding the path generated as well as the time at which the flight should occur can be based at least in part on such data. Expected lighting conditions can be based on a variety of different factors, such as atmospheric haze, heat shimmer, and seasonal variations (see FIG. 5). In general, the amount of moisture, dust and smoke particles visible in the air (haze) is a major factor affecting visibility. A low haze layer can have a detrimental effect on image quality. In some embodiments, the path planning algorithm will seek to output a path that instructs the UAV to fly on a day when there is minimal haze, and visibility remains clear for several miles. In other embodiments, the plan planning algorithm can suggest that UAV equipped with a camera featuring an ultraviolet (UV) filter that reduces atmospheric reflections or a polarizing filter, should be used for this particular mission to minimize the effect of haze. A polarizer will reduce reflections dependent upon your angle to the sun, and also tends to darken blue skies and whiten clouds. In another embodiment, the path planning algorithm can generate a proposed path that directs the UAV to fly at a lower altitude (where there is less atmosphere), and therefore less haze.

Furthermore, the presence of clouds can affect visibility. Overcast, cloudy conditions above the target area will tend to make an aerial scene look flat by diffusing the light. High, thin clouds can have little or great effect, depending on how much of it there is. In some cases, overall diffusion caused by an overcast sky can be of benefit for shooting structures on their normally-shaded side or when you wish to reduce overall contrast and have no harsh shadows. However, broken clouds can create unusual shadow patterns on the ground, which generally detract from the aerial images. Thus, in some embodiments, the path planning algorithm can determine, based on data indicating the target location will be associated with a great deal of cloud cover (e.g., around or above 30% or 40% of the sky is covered by clouds), that the mission should not be performed until another day.

In addition, if the sun is particularly bright at certain times of day, rising heat waves may cause a shimmering effect in the air, particularly near ground level above surfaces that absorb heat (like a road surface) or reflect light (like a shiny metal roof). Excessive shimmer can distort the view, and is more noticeable when using a long lens at fairly low altitude. In some embodiments, the path planning algorithm can be configured to delay the flight of the UAV to the target location until the heat waves are expected to decrease.

Figure 4:
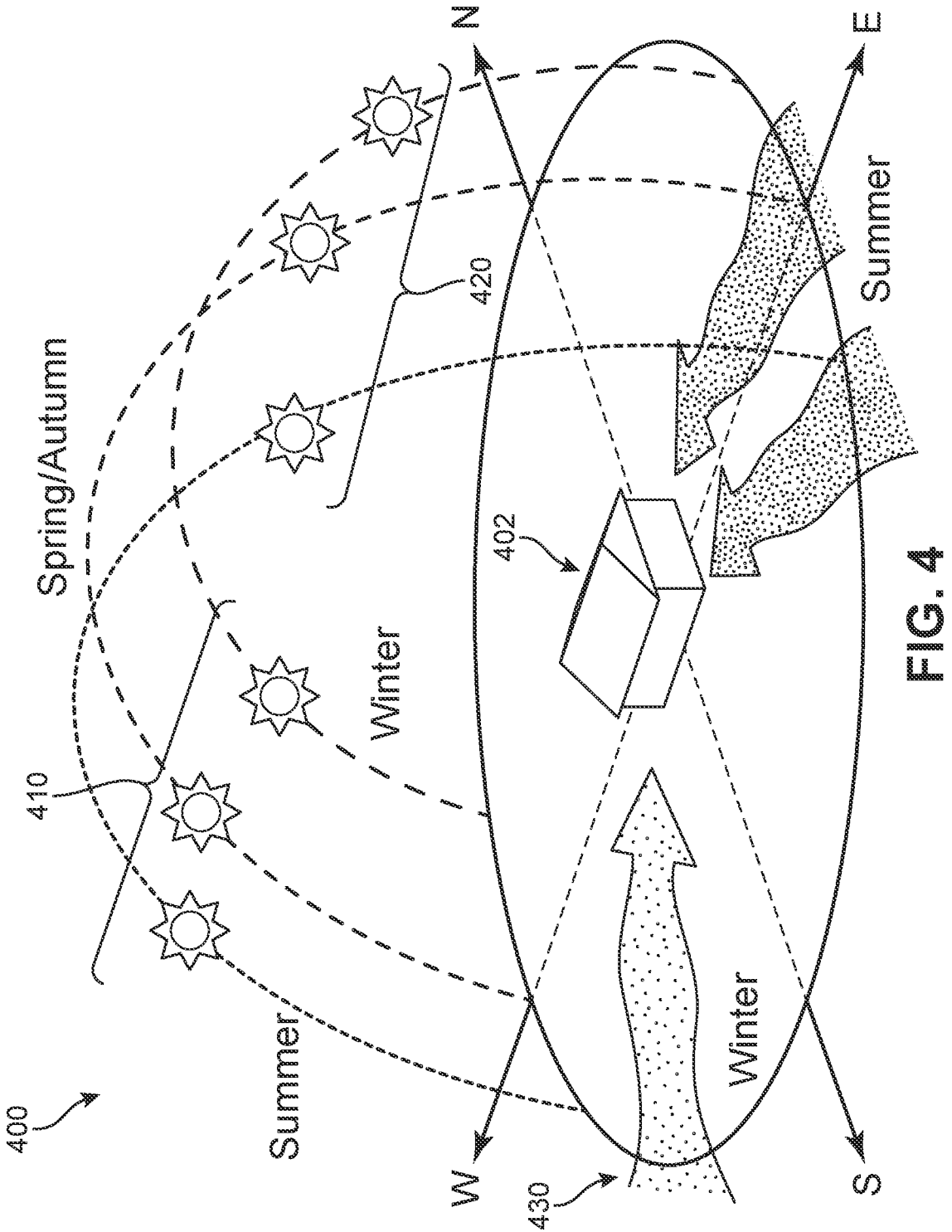
FIG. 4 is an example of some of the effects of seasonality and thermal patterns on the visibility of and safe flyability by a UAV over a structure, according to an embodiment.

In a third example, thermals and wind 306 can strongly impact flying conditions (see FIG. 4 below). Data for real-time or predicted thermal conditions can be obtained by the path planning module and decisions regarding the path generated as well as the time at which the flight should occur can be based at least in part on such data. High winds and thermals (rising currents of warm air) can affect an aircraft's maneuverability, and potentially lead to bumpy image capture sessions. Furthermore, high wind speed makes it difficult for a drone to maintain its position, resulting in complicated maneuvering or shorter flight times. Wind can also push the UAV off course, forcing the motors to work harder in order to remain stable and on course. In response to data indicating high winds, the path planning algorithm can recommend postponing the flight until wind speed has slowed. However, a lack of wind can also create problems, leading to a build-up of haze, particularly on warm days over metropolitan areas. In such cases, the path planning algorithm can generate a proposed path instructing the UAV to fly at lower altitude to offset the effect of haze.

Other factors can also influence the path that will be selected by the path planning algorithm. In some embodiments, the path planning module can access information from structural and geographical characteristics repository

234, as shown in FIG. 3B. This information can be provided or made available by the insurance company which may keep records of structural details for its insured properties. In one example, the path planning module may make reference to a policy database of the requesting insurer or party to identify and retrieve information about the insured structures or structures that are otherwise relevant to the end-user and located within the target region. For example, upon learning that a disaster has occurred, an insurance company (or other party) may prepare a list of structures in the disaster area that are insured and thus require damage assessments to be performed.

In different embodiments, such data may include target property data 322, primary structure dimensions 324, primary structure features of interest 326, secondary structures associated with property 328, land attributes 330, no-fly zones 332, and/or known viewing obstacles or obstructions 334. Target property data 322 refers to location information. As a general matter, each structure may be associated with location information. As used herein, the term "location information" refers to any kind of information that can be find a geographic location for an object. Location information may include latitude and longitude information. Location information could also comprise a street address. It may be appreciated that location information provided in one format (for example, a street address for a structure) could be converted into another format (for example, a latitude and longitude position). When the location information is specific to a structure (such as a house, office building, or any other structure) the term "structure location" may be used. By obtaining a list of structure locations, the system can capture images of areas that include the structure locations. For example, an airplane may fly over the disaster area and photograph areas according to the provided list of structure locations. In addition, the structure may be associated with a point address or a locator code or name created for common addresses that contain a street number and street name. This locator role uses feature classes with polygon or point geometry as the primary reference data. Thus, each feature in the primary reference data corresponds to a single address.

Primary structure dimensions 324 refer to geo-spatial details for the target destination, including parcel boundaries and a centroid for the structure and any additional secondary structures associated with the structure, as well as other physical properties of the structure that may influence the path selected for image capture, such as the perimeter shape and size of the structure as observed from various angles and altitudes. In addition, primary structure features of interest 326 refer to physical features of the structure that may be tagged as being of particular value or significance to the objectives of the mission. In such cases, the proposed path generated by the path planning algorithm can include instructions for the UAV to position itself at a location adjacent to or with an otherwise unobstructed view of the tagged ("called-out") feature of the structure. For example, in damage assessments, some features that may be of particular interest can include but are not limited to windows and their arrangement and location on the structure, pools, sunrooms, solar panels, decks, shutters, and other exterior facets of the structure such as balconies, sidings, gutters, roof tiles, external stairways, paved areas adjacent to the structure, rails, posts, pillars, etc.

Secondary structures associated with property 328 refer to additional structures that are separate from the primary structure but nevertheless should be included during image collection. For example, pools, sheds, MIL house, arbors, garden structures, patios, gazebos, or any other out-building or structure can be identified and its dimensions and location information relative to the primary structure can be applied to alter the path selected and ensure images of all pertinent structures are clearly captured.

In addition, land attributes 330 refer to unusual or otherwise significant physical features of the land on which the structure is disposed, including but not limited to vegetation, trees, hills, etc. Such information can affect the altitude that can be flown by the UAV, and also represent additional targets that can be highlighted by the end-user for image capture. No-fly zones 332 generally refer to locations or portions of a target location that have been designated as regions where coverage is simply unnecessary or locations where the UAVs are not allowed to fly. Finally, known viewing obstacles 334 refer to aspects of the property that can affect whether the UAV can obtain clear, unobstructed images of the structure from particular angles or heights. Some possible obstacles can include awnings, walls or gates, shrubbery near to the structure, or other physical features that can block the view of the camera and/or cause a part of the structure to be in shadow from a particular viewpoint.

As noted earlier, the time of year (i.e., seasons) can affect the conditions in which the image is being taken. Thus, depending on the time of year, the path planning module can adapt the proposed path to optimize for the presence of photo-friendly light and wind conditions. Referring now to FIG. 4, an example of the effects of seasonality is depicted. The illustration presents a building 402 at a target location 400 and some possible variations in the location of the sun and day length, such as but not limited to sunrise, sunset, shadow length, sun angle, solar eclipse, sun position, sun phase, sun height, etc. Thus, lighting conditions can change dramatically through the course of the year. In FIG. 4, it can be observed that the movement of the sun between sunrises 410 and sunsets 420 move across the sky along different paths during the summer, winter, and spring/autumn seasons. Similarly, thermals 430 can move in one direction during winter and another during summer. Seasonality can thus represent an important factor in path planning. The path planning algorithm can be configured to automatically factor the seasonal variations in sun position and movement and thermal activity for the desired flight date when determining the optimal flight path.

Thus, as may be understood from FIGS. 2, 3A, 3B, and 4, where the path planning module has access to knowledge about the flight workspace, including details about the target area and any NFZs along the way, the path can be computed in an offline phase before its execution. Such data can facilitate the performance of the algorithm by shaping the path to accommodate the factors applicable to the target area. In some embodiments, portions of the target area may be covered with distinct resolutions through flights at different altitudes, according to the importance of each feature or subregion or based on the preferences of the end-user. The path planning module can generate multiple paths to evaluate their respective attributes such as efficiency, resolution, lighting, preferences, etc. and also take into account the properties of the UAV such as speed, size, start time, and so on. In some embodiments, the algorithm relies on the concept of 4D trajectory-based operations, i.e., a sequence of waypoints that consists of 3D coordinates and associated timestamps that a UAV passes. In one embodiment, during the in-flight phase, as a redundancy mechanism, when the UAV enters the airspace, its trajectories can be adapted due to emergent events, such as bad weather or emergency operations, using in-flight CDR methods or back-up or alternate paths that can be provided to the onboard computing system. For example, avoiding obstacles with waypoint guidance can be accomplished by creating diversion points off the planned path and outside of the obstacle by recomputing segments or the entire set of waypoints.

Figure 5:
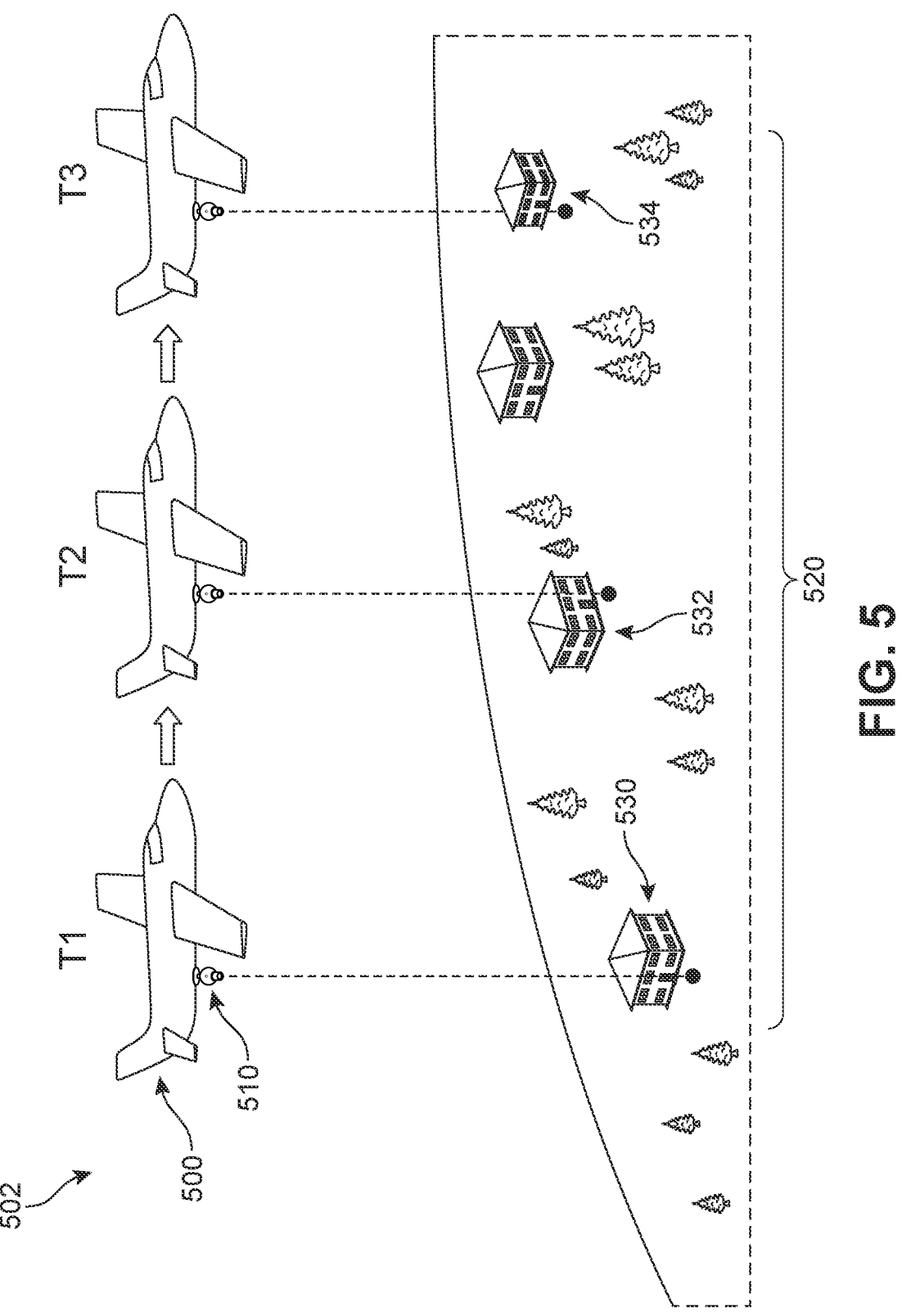
FIG. 5 is an illustration of a conventional aerial survey mission.

In order to provide some context for the improvements offered by the proposed systems, FIG. 5 presents an example of a conventional image capture mission for the reader's review. In FIG. 5, a schematic view of an aerial vehicle 500 performing a survey of a region 502 following a disaster is shown. As used herein, the term "aerial vehicle" refers to any kind of plane, helicopter, drone, or other flying vehicles. In this exemplary embodiment, aerial vehicle 500, also referred to simply as vehicle 500, is a plane operated by a pilot. However, in other embodiments, vehicle 500 could be remotely operated. Vehicle 500 includes at least one camera 510 for capturing images. In the example shown in FIG. 5, camera 510 is used to capture an image of a target area 520. Vehicle 500 may also include additional systems to facilitate capturing, processing, and transmitting image information about one or more areas.

As shown in FIG. 5, the vehicle 500 flies directly over target area 520, which includes four houses, three of which (530, 532, 534) represent insured properties. The flight path is relatively straight, corresponding to a direct route over the structures and allowing for image capture from directly above the homes at different times (e.g., T1, T2, T3, etc.) along different points in the path. Thus, the images collected will be limited in what features they reveal. Even for images collected by other camera orientations, the path, being a generic flyover that may be used across multiple locations, does not accommodate specific aspects of the structures that may need to be more clearly photographed, or adjust for obstacles that may obstruct the view of the structures.

Figure 6A:
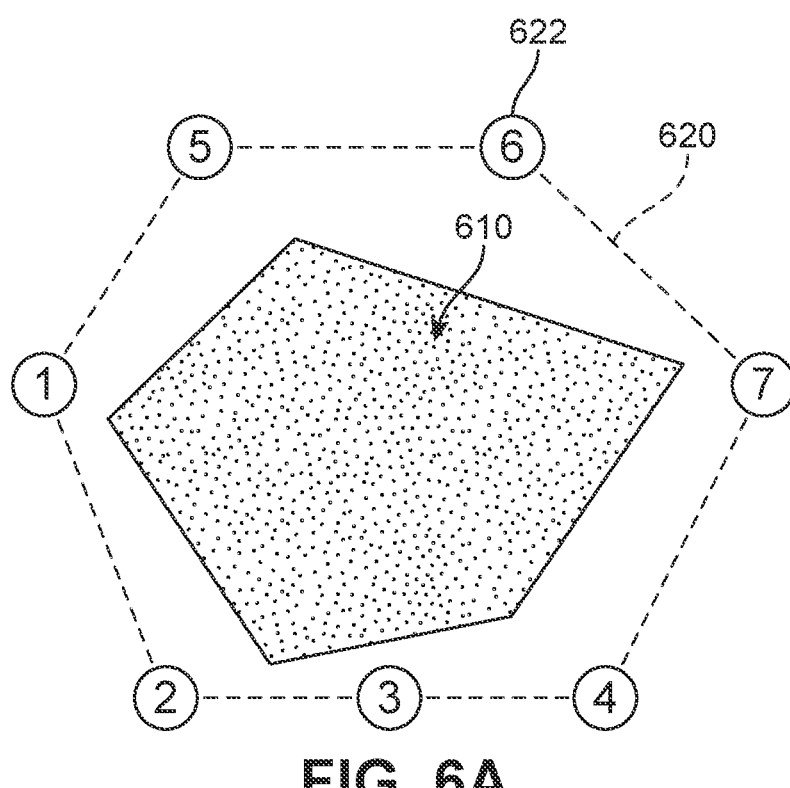
FIGS. 6A and 6B are examples of structural characteristics that may be considered by the path planning algorithm, according to an embodiment.

As noted earlier, the path planning algorithm can receive information about the structure dimensions and other structural characteristics. It can be appreciated that the shape of the area of interest can be critical to coverage path planning. In FIG. 6A, one example of a footprint for a target area 610 is shown in which the path planning algorithm has generated a proposed path 620 that includes multiple waypoints 622. A footprint generally refers to the area on a target site that is used by a building structure and is defined by the perimeter of the building, or the horizontal projected area of the built structure from the roof down to ground level.

In different embodiments, the flight path can include instructions for operation of the camera or UAV maneuvering that should occur when the UAV reaches or approaches a particular waypoint. Depending on the features of the structure, the coverage path shape can vary from the shape of the target area 610, as shown in FIG. 6A, to accommodate the factors described above and ensure optimal image collection of the salient structural features. While the algorithm may sometimes generate rectangular areas or simplify the coverage area shape to a rectangle, in other cases the path over the target area may encompass more complex shapes such as concave and convex polygons representing irregular areas. It should also be appreciated that the optimal path may not include a closed shape, but rather segments extending from one waypoint to the next (see FIG. 7). Indeed, a target area can include different shapes and complexities. Generally, simple areas of interest, such as rectangular and convex polygons, do not require any discretization method or decomposition technique, and can typically be explored by back-and-forth and spiral flight patterns. The back-and-forth pattern usually defines the sweep direction based on the major axis and uses 90-degrees angles for turning maneuvers. In polygonal cases, the turning angle may vary both back-and-forth and spiral. In general, these patterns require low computational time to find coverage paths and are relatively easy to perform by the UAV. In larger and more complex areas of interest, an exact cellular decomposition may be applied to split the scenario into subregions that are explored by a series or sequence of pre-determined paths. The resulting sub-regions can be covered by different path directions to obtain an optimal coverage. In such areas, there is the possibility to explore four back-and-forth alternatives, varying the direction and the orientation, aiming at minimizing the distance among the subareas.

Figure 6B:
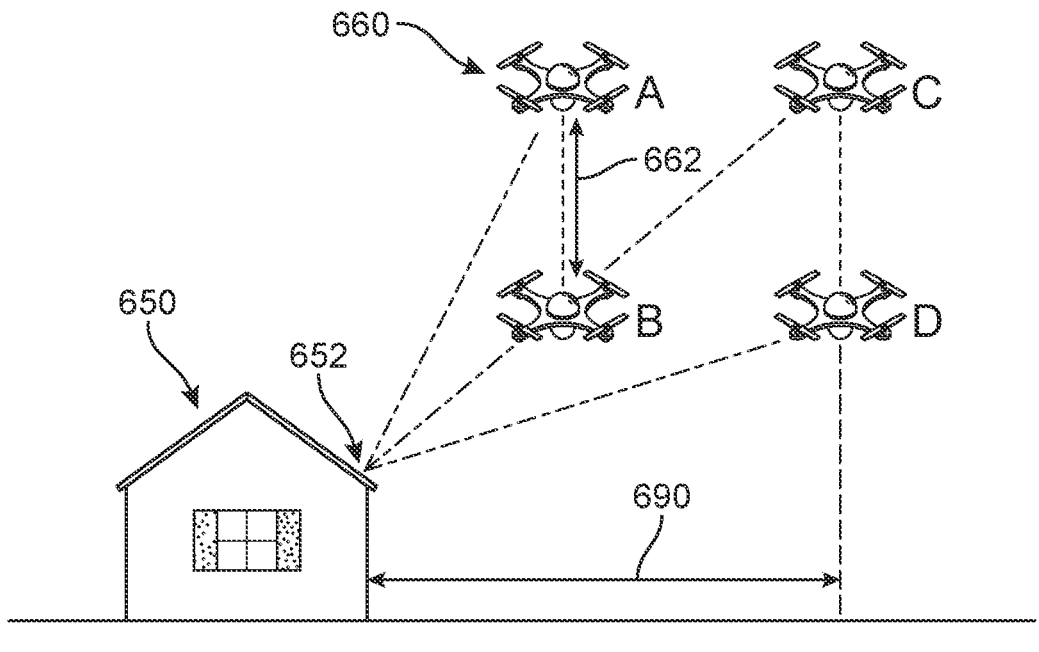

It can be appreciated that the path output by the algorithm will also instruct the UAV the height or altitudes at which the images should be captured. In FIG. 6B, a house 650 is shown for reference as a drone 660 moves up and down (vertically) between two points at A and B represented by a first distance 662. This difference in height can impact the angle at which the target structural feature is viewed and so affect the image that is captured. Depending on the feature that is being targeted (e.g., a roof corner 652), the altitude can significantly affect how the feature appears in the captured image. Similarly, the horizontal distance between the UAV and the structure will also be considered. Variations in the horizontal distance (i.e., moving horizontally closer to or further away from the structure) can also impact the angle at which the target structural feature is viewed and so affect the image that is captured, for example a second distance 690 between UAV at position "B" and UAV at position "D". Depending on the feature that is being targeted (e.g., the roof corner 652), the distance from a structure can significantly affect how the feature appears in the captured image. Thus, both spatial attributes can be modulated by the algorithm to generate a path that offers the highest resolution and/or quality images for the target structure and its individual components or features of interest.

Figure 7:
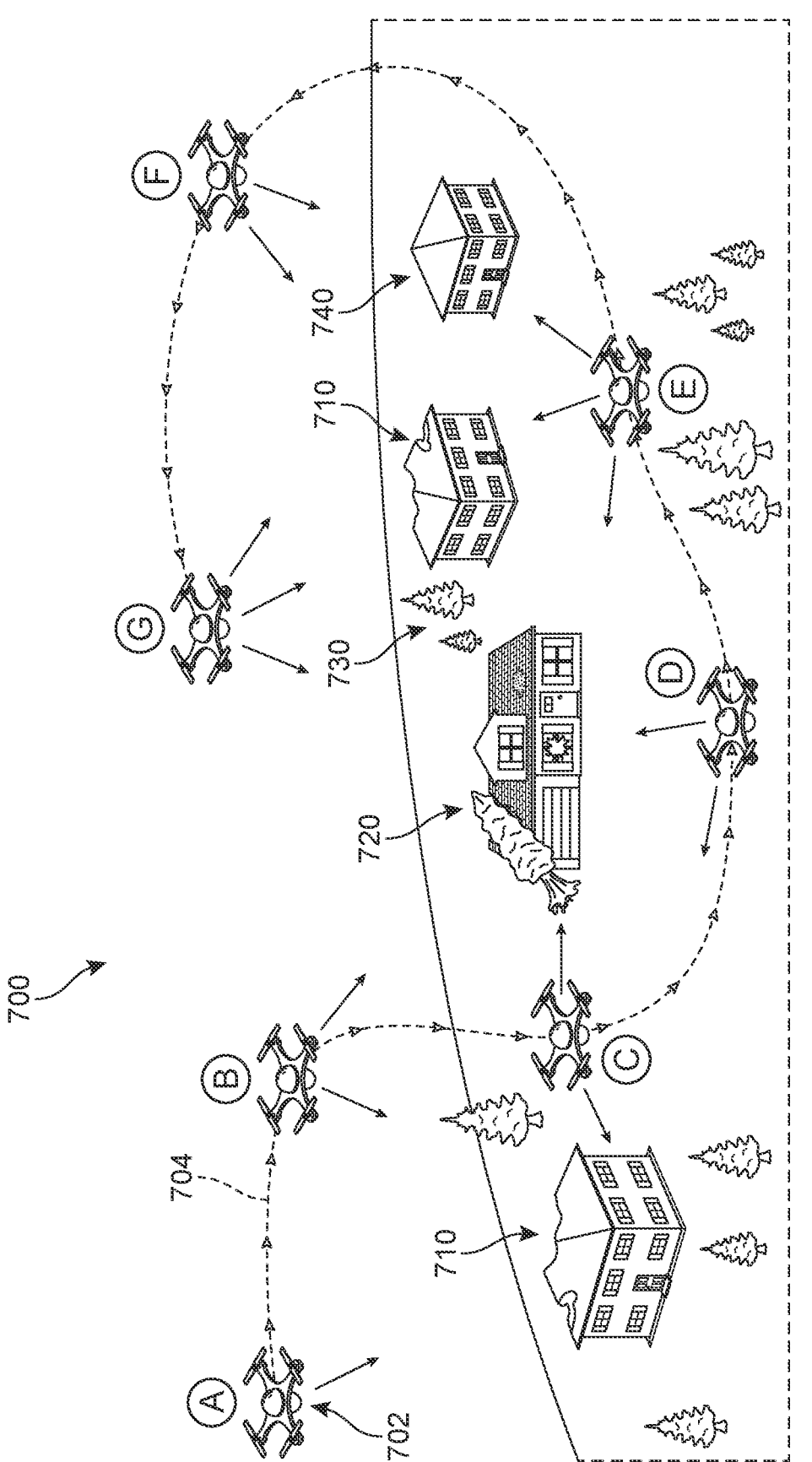
FIG. 7 is an example of a pre-generated flight path being executed by a UAV during an aerial survey over a residential area, according to an embodiment.
Figure 8:
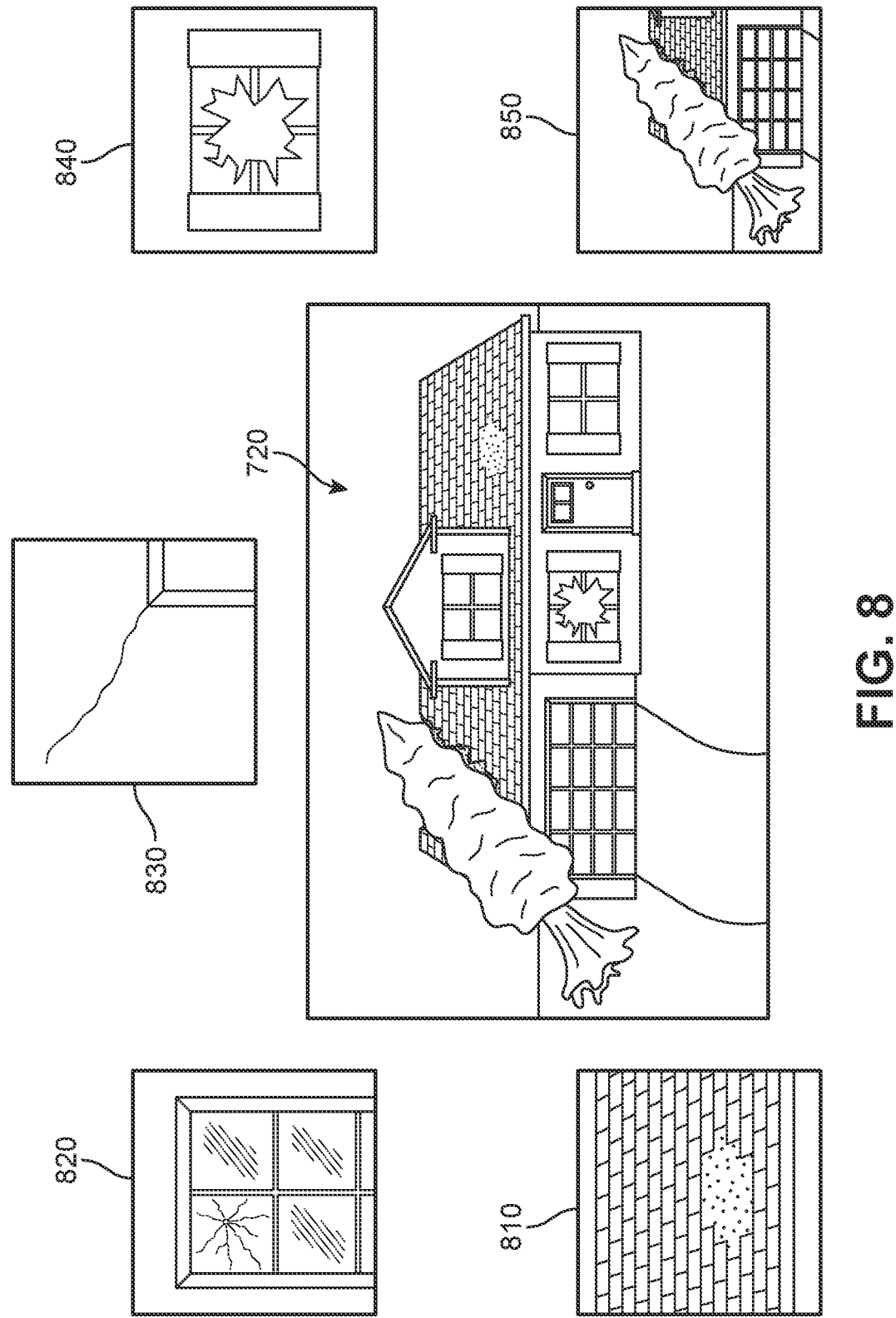
FIG. 8 is an example of images that were collected by the UAV of FIG. 7, according to an embodiment.
Figure 9:
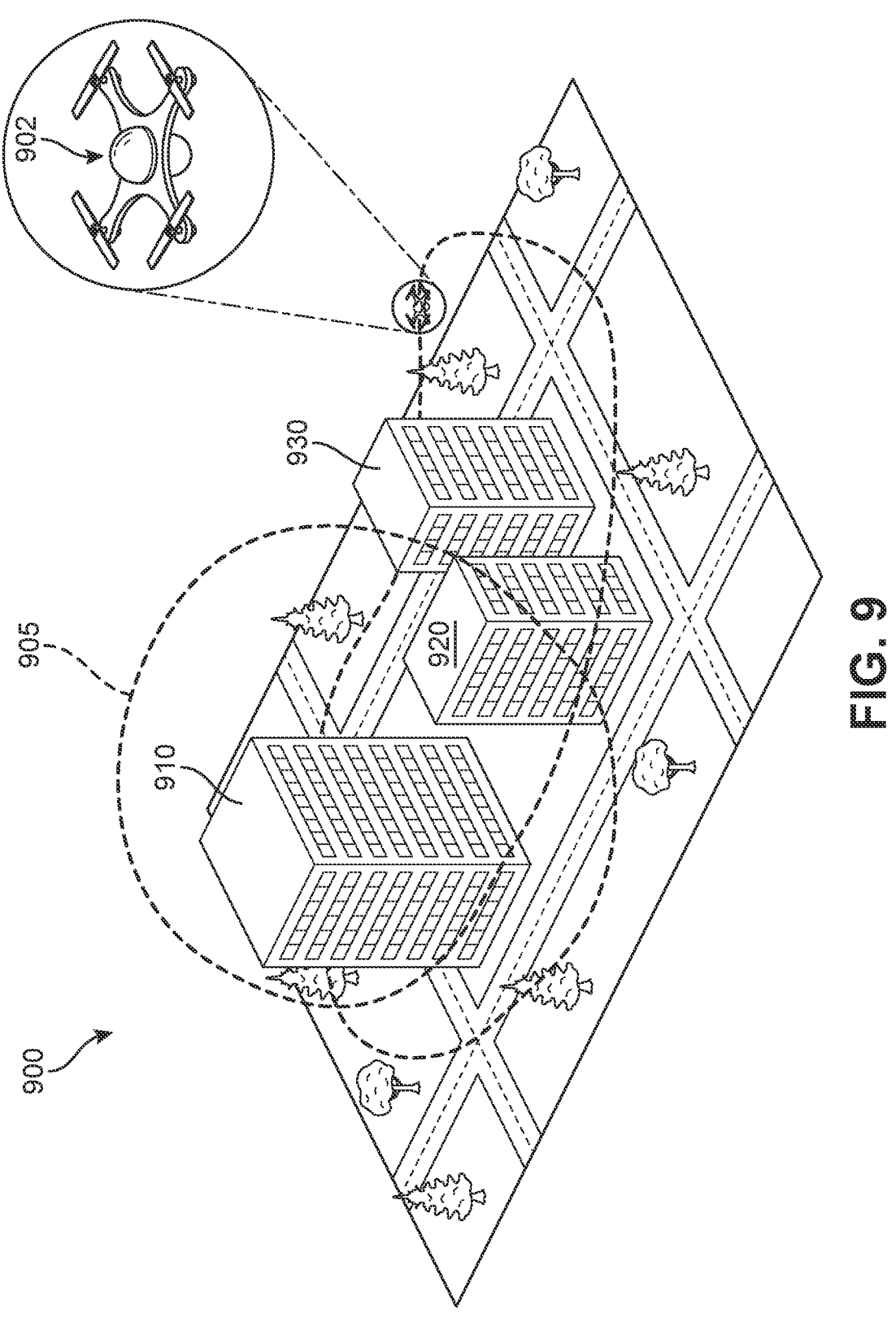
FIG. 9 is an example of a pre-generated flight path being executed by a UAV during an aerial survey over an urban area, according to an embodiment.

FIGS. 7-9 present two examples of pre-generated optimized paths that may be generated by some embodiments of the path planning algorithm and implemented by a UAV. In FIG. 7, a first vehicle 702 is shown as it performs its flight along a first optimized route ("first route") 704 over a first target location 700 that includes a first house 710, a second house 720, a third house 730, and a fourth house 740. The houses have been damaged by a recent disaster such as a tornado or hurricane. This type of collection or survey can be performed across large areas of land to support the automated processing and generation of damage assessments for multiple structures in an affected region. In many cases, homes and other buildings in a city may have insurance policies that cover loss following a disaster such as a tornado.

In contrast to the relatively simple and nonspecific path traditionally traversed by drones during aerial photography sessions over multiple structural targets (see FIG. 5), the first route 704 has been fine-tuned and adapted, based on environmental and structural characteristics for first target location 700, to maximize the opportunity of the UAV to capture the most salient images as well as images of highest quality and resolution reflecting all features of interest.

The first vehicle 702 includes at least one camera. In one example, the camera can be configured to rotate or reorient its lens to capture images at different angles. In other examples, the vehicle itself can rotate to reorient the camera as needed. In FIG. 7, the directionality of the camera viewfinder is represented by a plurality of arrows extending from the first vehicle's base at each waypoint. In some embodiments, it can be of great importance that the imagery capture occurs at varying angles in order to, for example, collect sufficient image data to generate a 3D model. In some embodiments, the imagery can be obtained using both vertical imagery (nadir, 90 degrees) and oblique (45 degrees) imagery techniques. In general, vertical imagery offers an approximately straight-down aerial view of properties and locations, providing keen insight into rooftops and property surroundings, and at-a-glance situational awareness of large-scale catastrophe scenarios such as city-wide flooding. In contrast, oblique imagery provides an approximately 45° perspective of properties and locations from all four cardinal directions, allowing viewers to see and measure not only the top of objects but the sides as well (e.g., the external walls and windows of a building). In some embodiments, the pre-programmed route can include instructions for adjusting the orientation of the camera upon approaching or reaching specific waypoints. The two types of image techniques can be used to collect multiple images of the same structure.

In FIG. 7, as an example, only a portion of the full route is depicted (i.e., the route traveled to arrive at the first target location 700 and return to its point of origin are omitted for purposes of simplicity). In this case, the first vehicle 702 can be understood to travel sequentially between waypoints A, B, C, D, E, F, and G in order to capture the desired target objects and features at the most favorable environmental conditions and from waypoints that allow the UAV to perform its mission at varying heights, distances, and angles that are each best suited for capturing the distinct target objects. The first route 704 includes the execution of various multiple maneuvers and changes in altitude and orientation in accord with instructions provided by the pre-programmed route.

As an example of output that may be obtained following such a flight, FIG. 8 illustrates some images that were captured during the image collection session of second house 720. The images 810, 820, 830, 840, 850, having been captured along a route segment including waypoints B, C, D, E, and G that vary the position of the UAV relative to the second house 720 repeatedly, provide striking detail of each occurrence of damage to second house 720. These include roof damage such as missing tiles (first image 810), window damage along the rear of the house such as cracked glass (second image 820), external damage such as a crack along the house's front exterior (third image 830), window damage toward the front center of the house such as broken glass (fourth image 840), and yard debris such as a fallen tree that has impacted the house (fifth image 850). These images can be sent to the ground system and accessed by end-users for review.

As another example, in FIG. 9, a second vehicle 902 is shown as it performs its flight along a second optimized route ("second route") 904 over a second target location 900 that includes a city block comprising a first building 910, a second building 920, and a third building 930. In this case, the buildings have not been damaged but are the subject of an aerial imagery survey to establish a baseline or reference in case of future damage. Again, in contrast to the relatively simple and nonspecific path traditionally traversed by drones during aerial photography sessions over multiple structural targets (see FIG. 5), the second route 904 has been fine-tuned and adapted, based on environmental and structural characteristics for the second target location 900, to maximize the opportunity of the UAV to capture the most salient images as well as images of highest quality and resolution reflecting all features of interest. The larger dimensions of the structures in this example, particularly of first building 910, which are multi-storied edifices, have resulted in a pre-programmed route that roughly encircles the area in two broad loops at different heights.

It should be understood that only a portion of the full route is depicted in FIG. 9 (i.e., the route traveled to arrive at the second target location 900 and return to its point of origin are omitted for purposes of simplicity). In this case, the second vehicle 902 has been instructed to travel along the second route 904 in order to capture the desired target objects and features at the most favorable environmental conditions and at waypoint coordinates best suited for capturing the distinct features of each building. The second route 904 includes the execution of various multiple maneuvers and changes in altitude and orientation in accord with instructions provided by the pre-programmed route.

FIG. 10 is a flow chart illustrating an embodiment of a method 1000 of improving the efficiency of an aerial survey performed by an unmanned aerial vehicle (UAV) for one or more structures at a first target area. A first step 1010 includes receiving first data describing a first environmental condition for the first target area, and a second step 1020 includes automatically determining, based on at least the first environmental condition, that the aerial survey should occur during a first time. A third step 1030 includes automatically generating a first flight path for the UAV to survey the first target area, the first flight path including instructions to conduct the aerial survey during the first time. In addition, the method 1000 includes a fourth step 1040 of sending the first flight path to an onboard computing device of the UAV.

In different embodiments, the method may include additional steps or aspects. In one embodiment, the first environmental characteristic describes a weather condition. In another example, the first environmental characteristic describes a lighting condition. In yet another example, the first environmental characteristic describes a seasonal thermal pattern. In some embodiments, the method further includes steps of receiving second data describing a first structural characteristic for a first structure in the first target area, automatically determining that the aerial survey should include a first set of waypoints to accommodate the first structural characteristic, where the first flight path includes the first set of waypoints. In one example, the first structural characteristic describes a footprint for the first structure.

Other methods may be contemplated within the scope of the present disclosure. For example, in some embodiments, a method of improving the efficiency of an aerial survey performed by an unmanned aerial vehicle (UAV) for one or more structures at a first target area includes a first step of receiving first data describing a first structural characteristic for a first structure in the first target area. The method can also include a second step of automatically determining that the aerial survey should include a first set of waypoints to accommodate the first structural characteristic. In addition, the method includes a third step of automatically generating a first flight path for the UAV to survey the first target area, the first flight path including the first set of waypoints, and a fourth step of sending the first flight path to an onboard computing device of the UAV.

In other embodiments, this method may include additional steps or aspects. In one embodiment, the first structural characteristic describes a footprint for the first structure, while in another embodiment, the first structural characteristic describes one or more features of interest for the first structure. In some embodiments, the method may also include a step of receiving second data describing a first geographical characteristic of the first target area. In such cases the first geographical characteristic may be one of a land attribute, a no-fly zone, and a known viewing obstacle.

In another example, this method can also include steps of receiving second data describing a first environmental condition for the first target area, and then automatically determining, based on at least the first environmental condition, that the aerial survey should occur during a first time. In such cases, the first flight path includes instructions to conduct the aerial survey during the first time. In some embodiments, the first environmental characteristic describes a weather condition, while in other embodiments, the first environmental characteristic describes a lighting condition.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of improving the efficiency of an aerial survey performed by an unmanned aerial vehicle (UAV) for one or more structures at a first target area, the method comprising:

receiving first data describing at least one environmental condition for the first target area, wherein the first data includes historical seasonal information regarding one or more thermals;

wherein the historical seasonal information regarding one or more thermals includes information about one or more localities with rising currents of air that is warmer than surrounding air during one season and falling currents of air that is cooler than surrounding air during a different season;

automatically determining, based on at least the first data, that the aerial survey should occur during a first time;

receiving second data, from a geographical characteristics repository, describing one or more geographical characteristics of the first target area;

based on the received second data, automatically generating a first flight path for the UAV to survey the first target area, the first flight path including instructions to avoid the one or more geographical characteristics and including instructions to conduct the aerial survey during the first time; and executing the generated flight path by flying the UAV in order to conduct an aerial survey during the first time.

2. The method of claim 1, further comprising:

receiving second data describing a first structural characteristic for a first structure in the first target area; and automatically determining that the aerial survey should include a first set of waypoints to accommodate the first structural characteristic.

3. The method of claim 2, wherein the first flight path includes the first set of waypoints.

4. The method of claim 3, wherein the first structural characteristic describes a footprint for the first structure.

5. A system for improving the efficiency of an aerial survey performed by an unmanned aerial vehicle (UAV) for one or more structures at a first target area, the system comprising a processor and machine-readable media including instructions which, when executed by the processor, cause the processor to:

receive first data describing a first structural characteristic for a first structure in the first target area;

receive second data, from a geographical characteristics repository, describing a first geographical characteristic of the first target area;

receive third data describing at least one environmental condition for the first target area, wherein the third data includes historical seasonal information regarding one or more thermals;

wherein the historical seasonal information regarding one or more thermals includes information about one or more localities with rising currents of air that is warmer than surrounding air during one season and falling currents of air that is cooler than surrounding air during a different season;

automatically determine that the aerial survey should include a first set of waypoints to accommodate the first structural characteristic;

automatically generate a first flight path for the UAV to survey the first target area, the first flight path including the first set of waypoints; and send the first flight path to an onboard computing device of the UAV;

wherein automatically generating the first flight path includes generating instructions to avoid the first geographical characteristic and accommodate the one or more thermals; and wherein the system is further configured to execute the generated flight path by flying the UAV in order to conduct an aerial survey.

6. The system of claim 5, wherein the first structural characteristic includes a footprint for the first structure.

7. The system of claim 5, wherein the first structural characteristic includes one or more features of interest for the first structure.

8. The system of claim 5, wherein the instructions further cause the processor to:

automatically determine, based on at least the first environmental condition, that the aerial survey should occur during a first time.

9. The system of claim 8, wherein the first flight path includes instructions to conduct the aerial survey during the first time.

* * * * *